US012617162B2

(12) United States Patent　　　　(10) Patent No.:　US 12,617,162 B2
Lacalle　　　　　　　　　　　　　(45) Date of Patent:　　　May 5, 2026

(54) FORMING THERMOPLASTIC STRUCTURE STAMPING BLANK USING AUTOMATED FIBER PLACEMENT DEVICE

(71) Applicant: Rohr, Inc., Chula Vista, CA (US)

(72) Inventor: Javier Lacalle, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 582 days.

(21) Appl. No.: 17/986,560

(22) Filed: Nov. 14, 2022

(65) Prior Publication Data

US 2024/0157659 A1　　May 16, 2024

(51) Int. Cl.
　B29C 70/38　　　(2006.01)
　B29C 70/34　　　(2006.01)
　B29K 101/12　　　(2006.01)
　B29K 701/12　　　(2006.01)

(52) U.S. Cl.
　CPC .......... B29C 70/382 (2013.01); B29C 70/345 (2013.01); *B29K 2101/12* (2013.01); *B29K 2701/12* (2013.01)

(58) Field of Classification Search
　CPC ..... B29C 43/003; B29C 43/04; B29C 70/345; B29C 70/38; B29C 70/382; B29C 70/386; B29C 70/46; B29K 2101/12; B29K 2701/12
　See application file for complete search history.

(56) References Cited

U.S. PATENT DOCUMENTS 6,467,521 B1 * 10/2002 Pratt ........................ B29C 70/50
　　　　　　　　　　　　　　　　　　　156/361
9,278,484 B2　3/2016 Guzman 9,630,390 B2　4/2017　Brown
10,016,931 B2　7/2018　Kurtz
10,434,726 B1　10/2019　Hickman et al.
10,449,736 B2　10/2019　Prebil
11,358,321 B2　6/2022　Kruckenberg
2006/0216480 A1 * 9/2006　Weidmann .............. B29C 70/32
　　　　　　　　　　　　　　　　　　　156/221
2016/0001464 A1　1/2016　Suzuki
2018/0229452 A1 * 8/2018　Ogale .................... B32B 37/16

FOREIGN PATENT DOCUMENTS

FR　　3020779 A1 * 11/2015　............. B29B 11/16

OTHER PUBLICATIONS

Machine translation of FR-3020779, Hamlyn, Nov. 2015.*

* cited by examiner

*Primary Examiner* — Philip C Tucker
*Assistant Examiner* — Jimmy R Smith, Jr.
(74) *Attorney, Agent, or Firm* — Getz Balich LLC

(57)　　　　　　ABSTRACT

A method is provided for forming a thermoplastic structure. During this method, a substrate is provided. The substrate includes a substrate thermoplastic and a plurality of substrate fibers disposed within the substrate thermoplastic. The substrate fibers are arranged in a substrate pattern. A first layer is deposited on the substrate using an automated fiber placement device. The first layer includes a first layer thermoplastic and a plurality of first layer fibers disposed within the first layer thermoplastic. The first layer fibers are arranged in a first layer pattern that is different than the substrate pattern. A blank is stamped into the thermoplastic structure. The blank includes the substrate and the first layer where the first layer thermoplastic is consolidated with the substrate thermoplastic.

15 Claims, 10 Drawing Sheets

FORMING THERMOPLASTIC STRUCTURE STAMPING BLANK USING AUTOMATED FIBER PLACEMENT DEVICE

BACKGROUND

1. Technical Field

This disclosure relates generally to forming a thermoplastic structure and, more particularly, to forming the thermoplastic structure by stamping a stamping blank.

2. Background Information

A structure may be formed by stamping a fiber-reinforced polymer stamping blank. The stamping blank may be configured as a consolidated laminate of multiple layers. Each laminate layer may include a standard woven mesh, unidirectional or other types of fibers embedded within a polymer matrix. While the standard woven mesh of fibers and generic, constant thickness laminates may be readily available and inexpensive, it may be difficult provide the stamped structure with optimal fiber placement and orientation. There is a need in the art therefore for an improved method for forming a fiber-reinforced polymer structure with tailored fiber placement and/or orientation.

SUMMARY OF THE DISCLOSURE

According to an aspect of the present disclosure, a method is provided for forming a thermoplastic structure. During this method, a substrate is provided. The substrate includes a substrate thermoplastic and a plurality of substrate fibers disposed within the substrate thermoplastic. The substrate fibers are arranged in a substrate pattern. A first layer is deposited on the substrate using an automated fiber placement device. The first layer includes a first layer thermoplastic and a plurality of first layer fibers disposed within the first layer thermoplastic. The first layer fibers are arranged in a first layer pattern that is different than the substrate pattern. A blank is stamped into the thermoplastic structure. The blank includes the substrate and the first layer where the first layer thermoplastic is consolidated with the substrate thermoplastic.

According to another aspect of the present disclosure, another method is provided for forming a thermoplastic structure. During this method, a substrate is provided. The substrate includes a substrate thermoplastic and a plurality of substrate fibers disposed within the substrate thermoplastic. A first layer is deposited on the substrate using an automated fiber placement device. The first layer includes a first layer thermoplastic and a plurality of first layer fibers disposed within the first layer thermoplastic. The substrate is formed independent of the automated fiber placement device. A blank is stamped into the thermoplastic structure. The blank includes the substrate and the first layer where the first layer thermoplastic is consolidated with the substrate thermoplastic.

According to still another aspect of the present disclosure, another method is provided for forming a thermoplastic structure. During this method, a first substrate is provided. The first substrate includes a first substrate thermoplastic and a plurality of first substrate fibers disposed within the first substrate thermoplastic. A first layer is deposited on the first substrate using an automated fiber placement device to provide a first laminate member. The first layer includes a first layer thermoplastic and a plurality of first layer fibers disposed within the first layer thermoplastic. A second substrate is provided. The second substrate includes a second substrate thermoplastic and a plurality of second substrate fibers disposed within the second substrate thermoplastic. A second layer is deposited on the second substrate using the automated fiber placement device to provide a second laminate member. The second layer includes a second layer thermoplastic and a plurality of second layer fibers disposed within the second layer thermoplastic. A multi-layer stack includes the first laminate member and the second laminate member on the first laminate member. The multi-layer stack is consolidated together to provide a blank. The blank is stamped into the thermoplastic structure.

The substrate fibers may be arranged in a substrate pattern. The first layer fibers may be arranged in a first layer pattern that is different than the substrate pattern.

A first of the substrate fibers may follow a straight trajectory within the substrate thermoplastic. A first of the first layer fibers may follow a non-straight trajectory within the first layer thermoplastic.

The substrate fibers may be uniformly spaced within the substrate thermoplastic. At least some of the first layer fibers may be non-uniformly spaced within the first layer thermoplastic.

The substrate may be configured as or otherwise include a two-dimensional laminate.

The substrate pattern may be configured as or otherwise include a unidirectional pattern of the substrate fibers.

The substrate pattern may be configured as or otherwise include a weave of the substrate fibers.

The substrate may be configured as a pre-consolidated laminate.

The substrate may be configured as or otherwise include a sheet of prepreg material. The first layer may be deposited on the sheet of prepreg material.

The first layer thermoplastic may be consolidated with the substrate thermoplastic during the depositing of the first layer using the automated fiber placement device.

The method may also include consolidating the first layer thermoplastic with the substrate thermoplastic following the depositing of the first layer.

The first layer may be deposited on a select portion of the substrate.

The substrate may have an outer peripheral substrate geometry. The first layer may have an outer peripheral first layer geometry that is different than the outer peripheral substrate geometry.

The method may also include removing at least a portion of the substrate not covered by the first layer.

The method may also include depositing a second layer on the first layer using the automated fiber placement device. The second layer may include a second layer thermoplastic and a plurality of second layer fibers disposed within the second layer thermoplastic. The blank may also include the second layer where the second layer thermoplastic is consolidated with the first layer thermoplastic.

The second layer fibers may be arranged in a second layer pattern that is different than the substrate pattern and/or the first layer pattern.

The second layer may be deposited on a select portion of the first layer.

The method may also include: providing a second substrate, the second substrate including a second substrate thermoplastic and a plurality of second substrate fibers disposed within the second substrate thermoplastic, and the second substrate fibers arranged in a second substrate pattern; depositing a second layer on the second substrate using the automated fiber placement device, the second layer including a second layer thermoplastic and a plurality of second layer fibers disposed within the second layer thermoplastic, and the second layer fibers arranged in a second layer pattern that is different than the second substrate pattern; stacking the second substrate with the second layer onto the substrate with the first layer to provide a multi-layer stack; and consolidating the multi-layer stack together to provide the blank.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
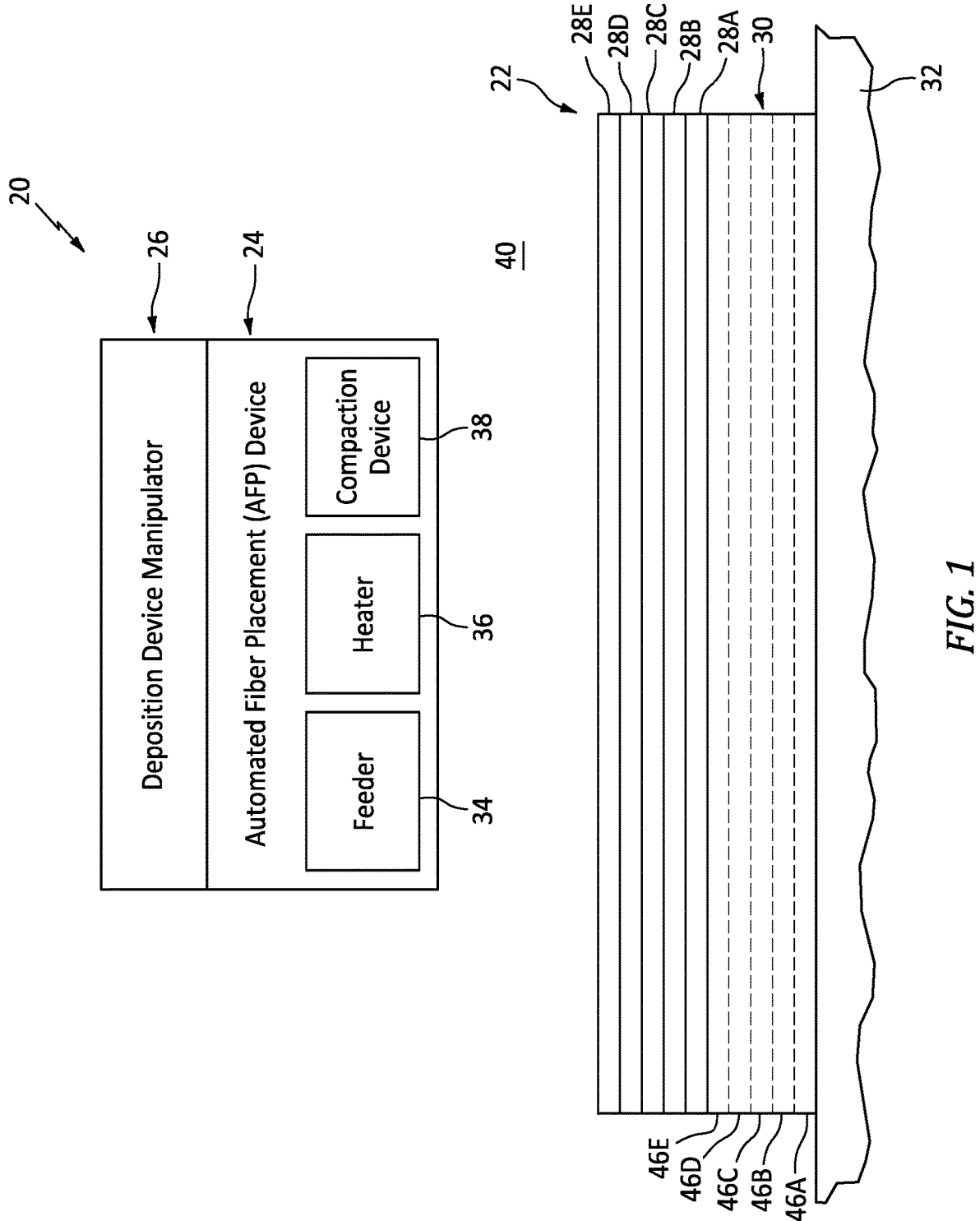
FIG. 1 is a schematic illustration of a system for forming a fiber-reinforced thermoplastic stamping blank.

FIG. 1 is a schematic illustration of a system 20 for forming a (e.g., a two-dimensional (2D)) fiber-reinforced thermoplastic stamping blank 22, which stamping blank 22 may be stamped into a (e.g., three-dimensional (3D)) fiber-reinforced thermoplastic structure. The thermoplastic structure may be configured as or may be part of a structure of an airframe for an aircraft. The thermoplastic structure may alternatively be configured as or may be part of a structure of a propulsion system for the aircraft. The present disclosure, however, is not limited to the foregoing exemplary thermoplastic structure configurations nor to aircraft applications.

The formation system 20 may include a material deposition device such as an automated fiber placement (AFP)

device 24. The formation system 20 of FIG. 1 also includes a deposition device manipulator 26.

Figure 2:
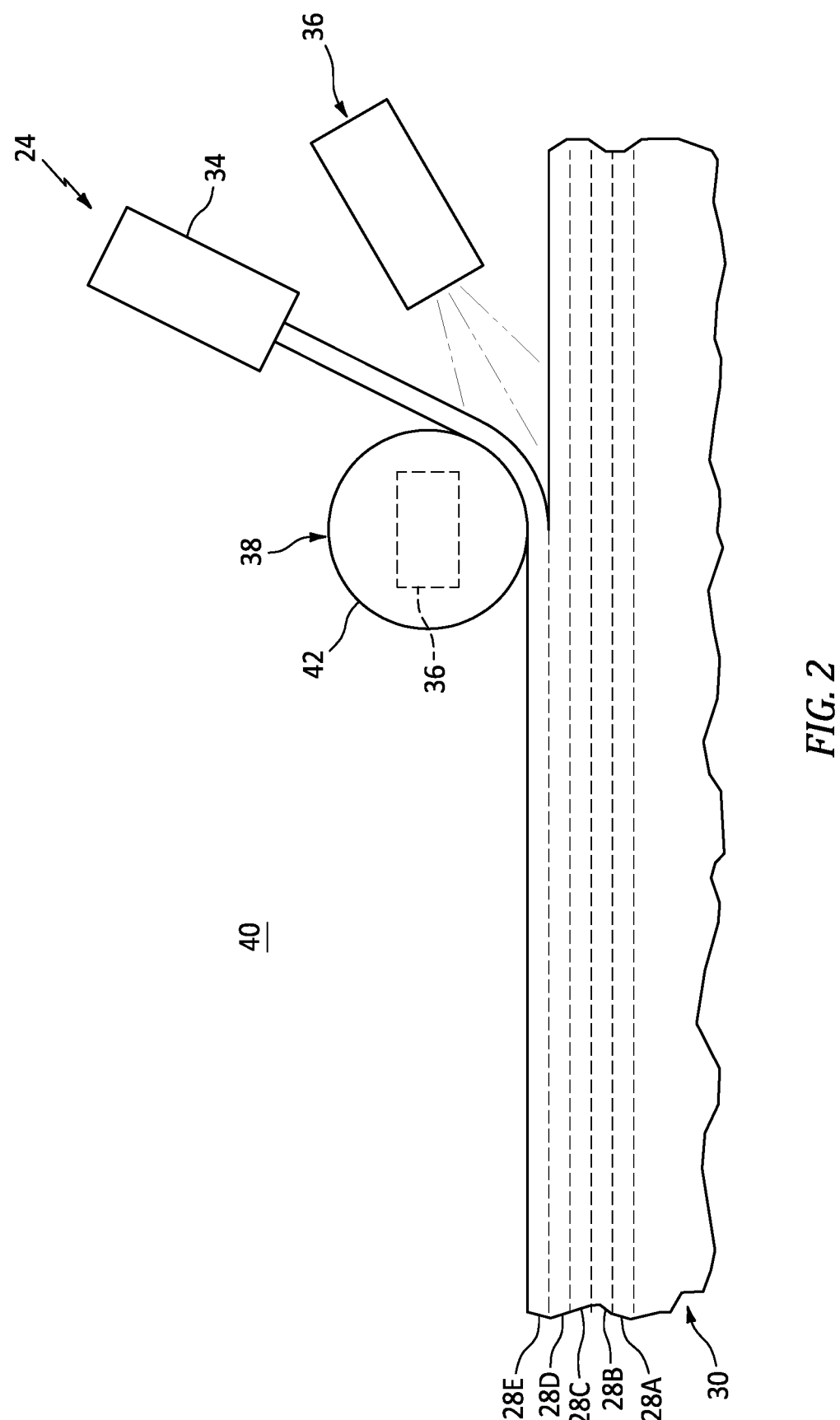
FIG. 2 is a schematic illustration of an automated fiber placement (AFP) device forming the stamping blank.

Referring to FIG. 2, the AFP device 24 is configured to deposit (e.g., place, dispense, apply, lay, etc.) one or more layers 28A-E (generally referred to as "28") of fiber-reinforced thermoplastic material over and onto a fiber-reinforced thermoplastic substrate 30 with one or more fully consolidated or partially consolidated thermoplastic plies, or another object. The AFP device 24 may also be configured to consolidate (or alternative tack) the respective stamping blank members 28 and 30 together during the deposition of the thermoplastic layer(s) 28. The AFP device 24 of FIG. 2, for example, includes a substrate support 32 (see FIG. 1), a material feeder 34, a deposition device heater 36 and a deposition device compaction device 38.

Briefly, each thermoplastic layer 28 may be formed from or otherwise include a layer thermoplastic and a layer fiber reinforcement within a matrix of the layer thermoplastic. The thermoplastic substrate 30 may be a two-dimensional (2D) material blank; e.g., a planar sheet or laminate of fiber-reinforced thermoplastic. This thermoplastic substrate 30 may be formed from or otherwise include a substrate thermoplastic and a substrate fiber reinforcement within a matrix of the substrate thermoplastic. The substrate thermoplastic and the layer thermoplastic may be a common (the same) thermoplastic, or different compatible (e.g., fusible) thermoplastics. Examples of the thermoplastic include, but are not limited to, polyether ether ketone (PEEK), polyether ketone ketone (PEKK) and polyphenylene sulfide (PPS). The substrate fiber reinforcement and the layer fiber reinforcement may be a common fiber reinforcement, or different fiber reinforcements. The fiber reinforcement may include one or more fibers; e.g., long strand fibers, continuous fibers, woven fibers, short fibers, etc. Examples of the fiber reinforcement fibers include, but are not limited to, fiberglass fibers, carbon fibers and/or aramid (e.g., Kevlar®) fibers. The present disclosure, however, is not limited to such exemplary thermoplastic and/or fibrous materials.

The substrate support 32 of FIG. 1 is configured to hold, fix, secure and/or otherwise support the thermoplastic substrate 30 within a formation space 40 (e.g., an internal, enclosed build space/formation chamber) of the formation system 20. The substrate support 32, for example, may be configured as or otherwise include a platform, a fixture and/or a retainer.

The material feeder 34 is configured to feed, direct and/or otherwise provide each thermoplastic layer 28 for deposition on the thermoplastic substrate 30.

The deposition device heater 36 of FIG. 2 is configured to heat a portion of a respective thermoplastic layer 28 (e.g., 28E in FIG. 2), which is about to be deposited and/or was just deposited, to an elevated deposition temperature. The deposition device heater 36 may also be configured to heat a portion of an underlying material to the deposition temperature, where the underlying material is material (e.g., the thermoplastic substrate 30 and/or the previously deposited thermoplastic layer(s) 28 (e.g., 28D in FIG. 2)) onto which the respective thermoplastic layer 28 (e.g., 28E in FIG. 2) is about to be deposited and/or was just deposited. This deposition temperature may be selected such that the thermoplastic within the respective stamping blank members 28 and 30, 28 and 28 soften and at least partially melt to facilitate fusion between the respective stamping blank members 28 and 30, 28 and 28. The respective stamping blank members 28 and 30, 28 and 28 may thereby be consolidated together. Alternatively, the deposition temperature may be selected such that the thermoplastic within the respective stamping blank members 28 and 30, 28 and 28 soften and become tacky. The respective stamping blank members 28 and 30, 28 and 28 may thereby be tacked together; e.g., without fully consolidating. Examples of the deposition device heater 36 include, but are not limited to, a laser heater, an electron beam heater, an electrical resistance (e.g., radiant) heater and a plasma or torch heater.

The compaction device 38 is configured to press the (e.g., heated) thermoplastic layer 28 (e.g., 28E in FIG. 2) being deposited onto the underlying material 30 or 28, without leaving (or with leaving minimal) gaps between the respective stamping blank members 28 and 30, 28 and 28 for example. The compaction device 38 may also press the respective thermoplastic layer 28 against the underlying material at a deposition pressure to facilitate bonding between the respective stamping blank members 28 and 30, 28 and 28. This deposition pressure, for example, may be selected to facilitate the consolidation of the respective stamping blank members 28 and 30, 28 and 28 together. Alternatively, the deposition pressure may be selected to facilitate tacking (e.g., tack welding) the respective stamping blank members 28 and 30, 28 and 28 together. The compaction device 38 of FIG. 2 is configured as or otherwise includes a roller 42 which rolls over and presses against the thermoplastic layer 28 being deposited. The present disclosure, however, is not limited to such an exemplary deposition device press. The compaction device 38, for example, may also or alternative be configured as or otherwise include a shoe which slides along and presses against the thermoplastic layer 28 being deposited.

In some embodiments, the deposition device heater 36 may be discrete from the compaction device 38. In other embodiments, the deposition device heater 36 may be arranged with (e.g., located within and/or otherwise thermally coupled with) the compaction device 38; e.g., see dashed lines in FIG. 2. The compaction device 38 may thereby provide a buffer between heat generated by the deposition device heater 36 and the thermoplastic within the respective thermoplastic layer 28 being deposited.

Figure 3:
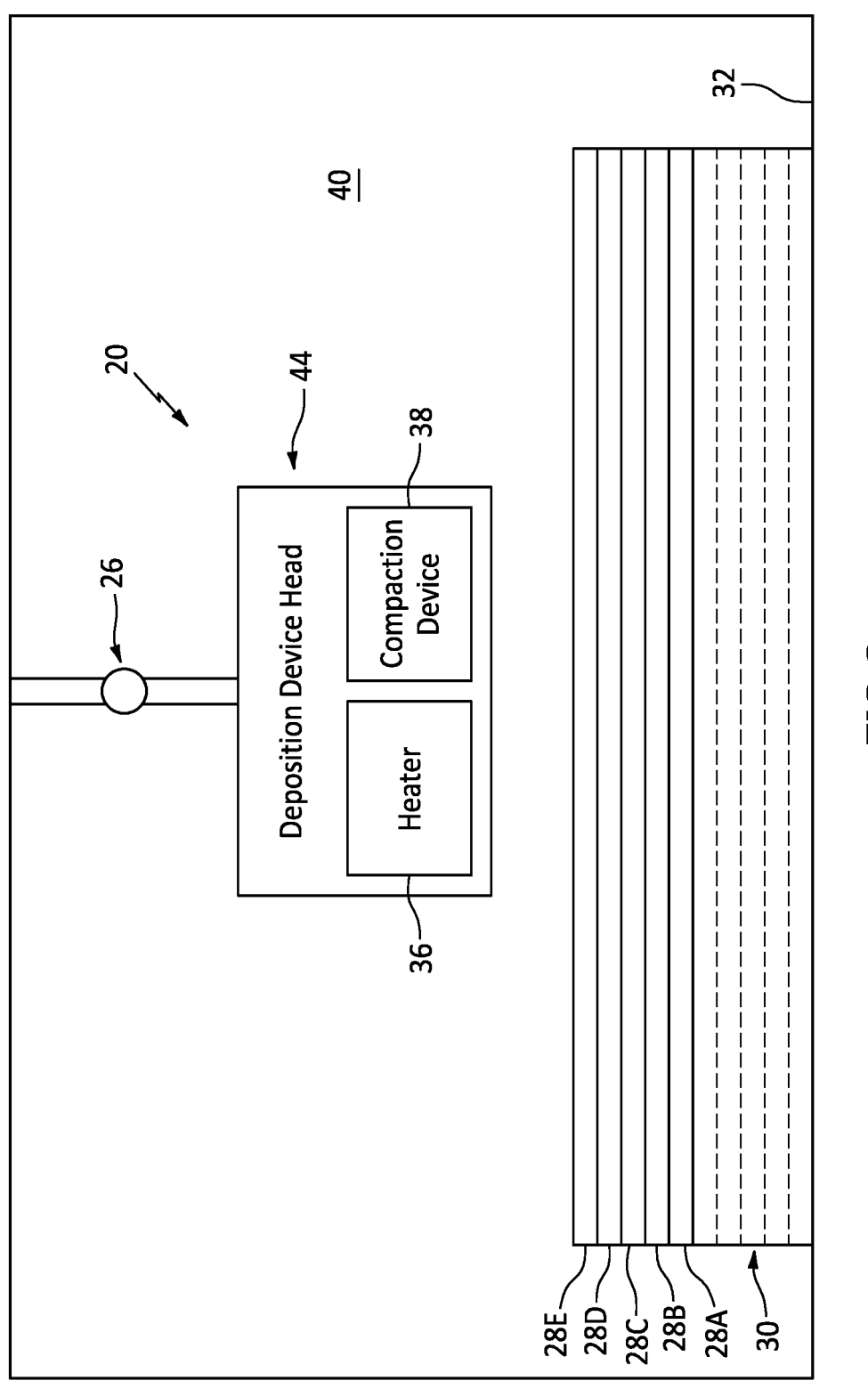
FIG. 3 is a schematic illustration of certain components of the formation system forming the stamping blank.

Referring to FIG. 3, the deposition device manipulator 26 is configured to move (e.g., relocate) at least a head 44 of the AFP device 24 within the formation space 40. More particularly, the deposition device manipulator 26 is configured to move the AFP device head 44 along the thermoplastic substrate 30 to facilitate the deposition of the thermoplastic layer(s) 28 with the thermoplastic substrate 30. Briefly, the AFP device head 44 may include any one or more components of the AFP device 24 such as, but not limited to, the deposition device heater 36 and the deposition device compaction device 38. An example of the deposition device manipulator 26 is a single-axis or multi-axis robot. Another example of the deposition device manipulator 26 is a carriage translatable along a track. The present disclosure, however, is not limited to the foregoing exemplary deposition device manipulators. Furthermore, in other embodiments, the substrate support 32 may also or alternatively be moved within the formation space 40 relative to the deposition device head components 36 and 38/the AFP device head 44.

Figure 4:
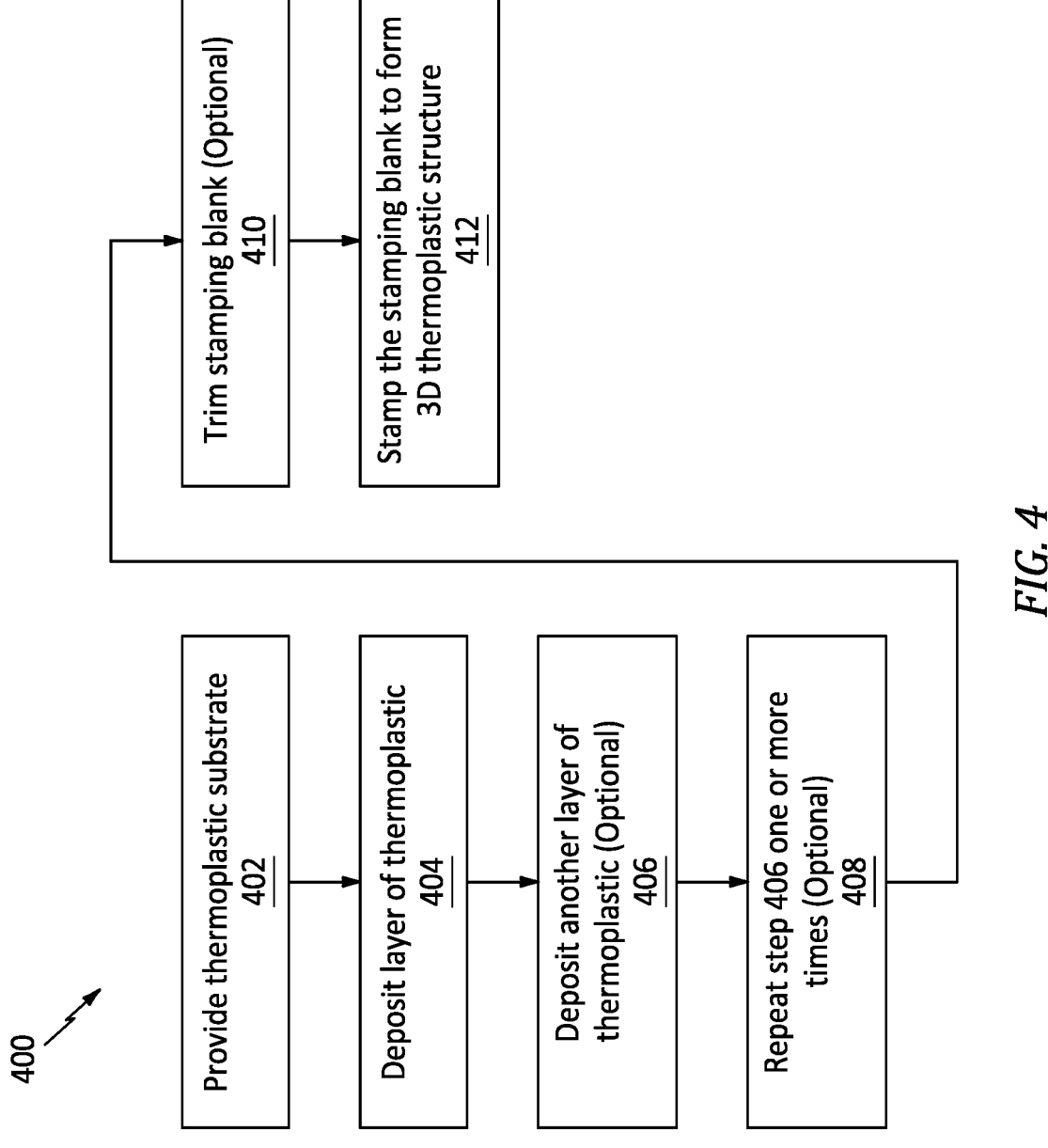
FIG. 4 is a flow diagram of a method for forming a thermoplastic structure.

FIG. 4 is a flow diagram of a method 400 for forming the thermoplastic structure. For ease of description, the formation method 400 is described below with reference to the formation system 20 of FIGS. 1-3. The formation method 400 of the present disclosure, however, is not limited to using any particular type or configuration of formation system/formation system components.

Figure 5:
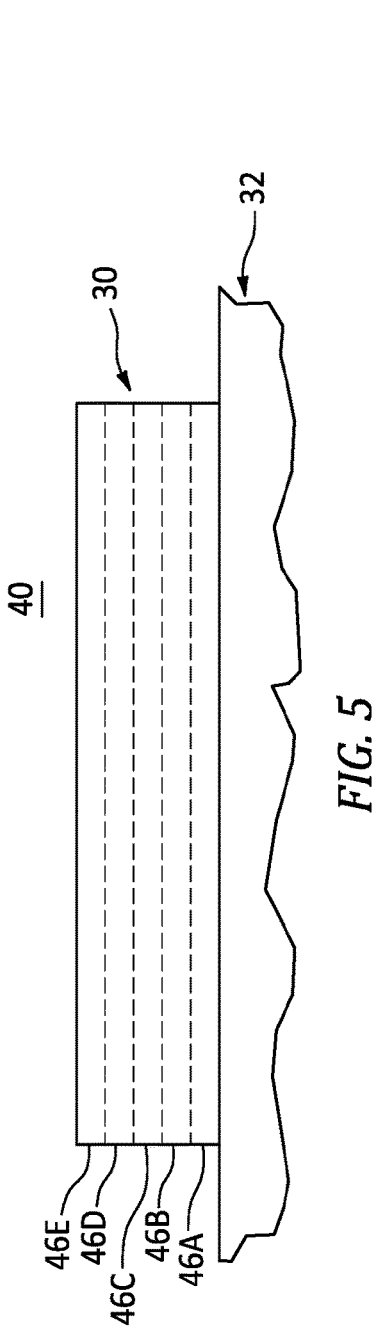
FIG. 5 is a schematic illustration of a fiber-reinforced thermoplastic substrate on a substrate support.

In step 402, the thermoplastic substrate 30 is provided. Referring to FIG. 5, this thermoplastic substrate 30 is arranged within the formation space 40 on the substrate support 32.

The thermoplastic substrate 30 may be pre-manufactured. The term "pre-manufactured" may describe an object that is manufactured using method(s) and/or tool(s) independent from the formation method 400 and/or the formation system 20. The thermoplastic substrate 30, for example, may be manufactured prior to the performance of the formation method 400 and/or using tool(s) other than the specific AFP device 24 used during formation method 400. However, it is contemplated the thermoplastic substrate 30 may be pre-manufactured using another automated fiber placement (AFP) device. It is also contemplated the thermoplastic substrate 30 may alternatively be manufacturing as a (e.g., initial) step of the formation method 400. For example, the substrate fiber reinforcement may be impregnated with the substrate thermoplastic during the formation method 400.

The thermoplastic substrate 30 may have a generic and/or standardized configuration. The thermoplastic substrate 30, for example, may be a standard pre-consolidated sheet or laminate, a standard prepreg sheet or laminate, etc. Such a generic and/or standardized configuration may facilitate mass production for multiple different applications. The thermoplastic substrate 30 may thereby be obtained as an off-the-shelf product at a relatively low cost. Of course, in other embodiments, the thermoplastic substrate 30 may alternatively have a configuration unique to this thermoplastic structure application. The thermoplastic substrate 30, for example, may be a unique pre-consolidated sheet or laminate, a unique prepreg sheet or laminate, an automated fiber placed (AFP) sheet or laminate, etc.

The thermoplastic substrate 30 of FIG. 5 may include one or more layers 46A-E (generally referred to as "46") of the substrate fiber reinforcement within the substrate thermoplastic matrix. These substrate layers 46 may be consolidated together where the thermoplastic substrate 30 is a pre-consolidated laminate. Alternatively, the substrate layers 46 may be tacked together where the thermoplastic substrate 30 is a prepreg (e.g., partially consolidated) laminate.

Each of the substrate layers 46 may have a common configuration. The substrate layers 46, for example, may have common material makeups, common geometries (e.g., dimensions, peripheral boundary shapes, etc.) and/or common patterns of fibers within their substrate fiber reinforcements. For example, referring to FIG. 6, the substrate reinforcement fibers 48 in each substrate layer 46 may be arranged in a unidirectional pattern where (e.g., all of) the substrate reinforcement fibers 48 are parallel with one another. Each of the substrate reinforcement fibers 48 may also follow a straight line trajectory within the respective substrate layer 46/through the substrate thermoplastic 50. In another example, referring to FIG. 7, the substrate reinforcement fibers 48 in each substrate layer 46 may be woven together in a woven (e.g., textile) pattern; e.g., a weave. Examples of the weave for the woven pattern include, but are not limited to, a plain weave, a twill weave, a satin weave, a basket weave and a leno weave. Each of the substrate reinforcement fibers 48 may also follow a substantially straight line trajectory (e.g., in a plane of the substrate layer 46) within the respective substrate layer 46/through the substrate thermoplastic 50. The present disclosure, however, is not limited to the foregoing exemplary substrate patterns. Furthermore, it is contemplated one or more of the substrate layers 46 may have a configuration (e.g., fiber pattern) that is different than a configuration of one or more other substrate layers 46.

Figure 7:
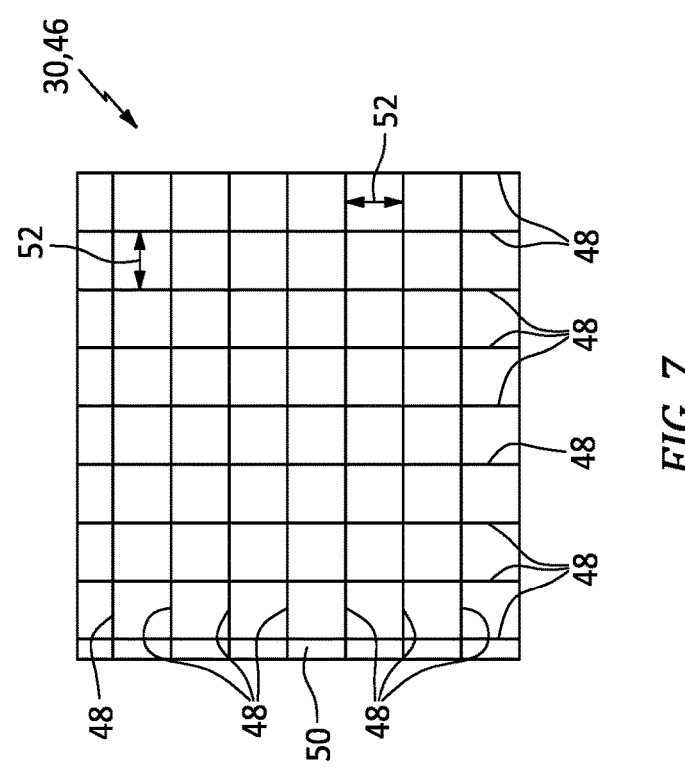
FIG. 7 is a schematic illustration of a portion of the thermoplastic substrate with woven fibers.
Figure 6:
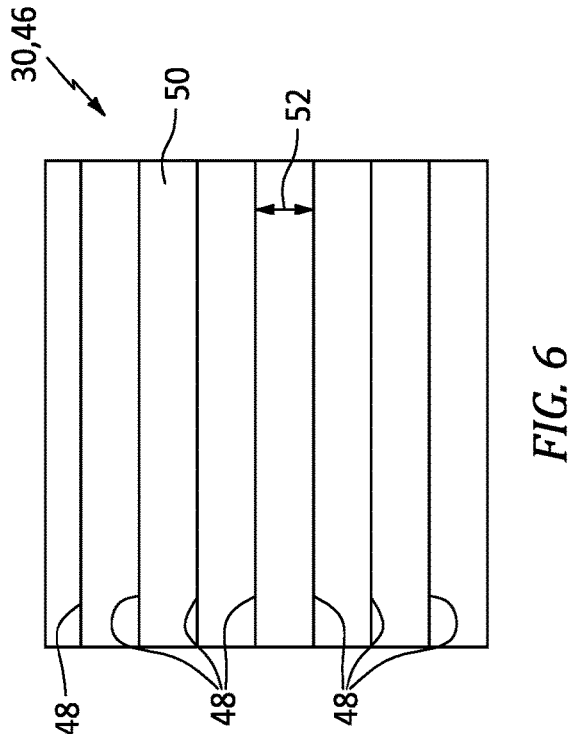
FIG. 6 is a schematic illustration of a portion of the thermoplastic substrate with unidirectional fibers.

Within each substrate layer 46, referring to FIGS. 6 and 7, the substrate reinforcement fibers 48 may be uniformly spaced from one another. Each substrate reinforcement fiber 48, for example, may be laterally spaced from each similarly oriented neighboring (e.g., laterally adjacent) substrate reinforcement fiber 48 by a common distance 52. This distance 52 may also stay constant along longitudinal lengths of the neighboring substrate reinforcement fibers 48.

In step 404, an initial thermoplastic layer 28A is deposited within the formation space 40. The AFP device 24, for example, may lay the initial thermoplastic layer 28A onto an exterior (e.g., top) surface of the thermoplastic substrate 30. To facilitate this deposition, the deposition device manipulator 26 moves the AFP device head 44 within the formation space 40. As the initial thermoplastic layer 28A is being laid, the deposition device heater 36 may partially melt the initial thermoplastic layer 28A and/or the thermoplastic substrate 30 at (e.g., on, adjacent and/or proximate) a location where the initial thermoplastic layer 28A is pressed against the thermoplastic substrate 30 by the deposition device compaction device 38. This heating and pressing may facilitate a (e.g., full or partial) consolidation of the stamping blank members 28 and 30 together.

In step 406, another (e.g., subsequent) thermoplastic layer 28B may be deposited within the formation space 40. The AFP device 24, for example, may lay the subsequent thermoplastic layer 28B onto an exterior (e.g., top) surface of the initial thermoplastic layer 28A. To facilitate this deposition, the deposition device manipulator 26 moves the AFP device head 44 within the formation space 40. As the subsequent thermoplastic layer 28B is being laid, the deposition device heater 36 may partially melt the subsequent thermoplastic layer 28B and/or the initial thermoplastic layer 28A at (e.g., on, adjacent and/or proximate) a location where the subsequent thermoplastic layer 28B is pressed against the initial thermoplastic layer 28A by the compaction device 38. This heating and pressing may facilitate a (e.g., full or partial) consolidation of the stamping blank members 28A and 28B together.

Figures 8, 9:
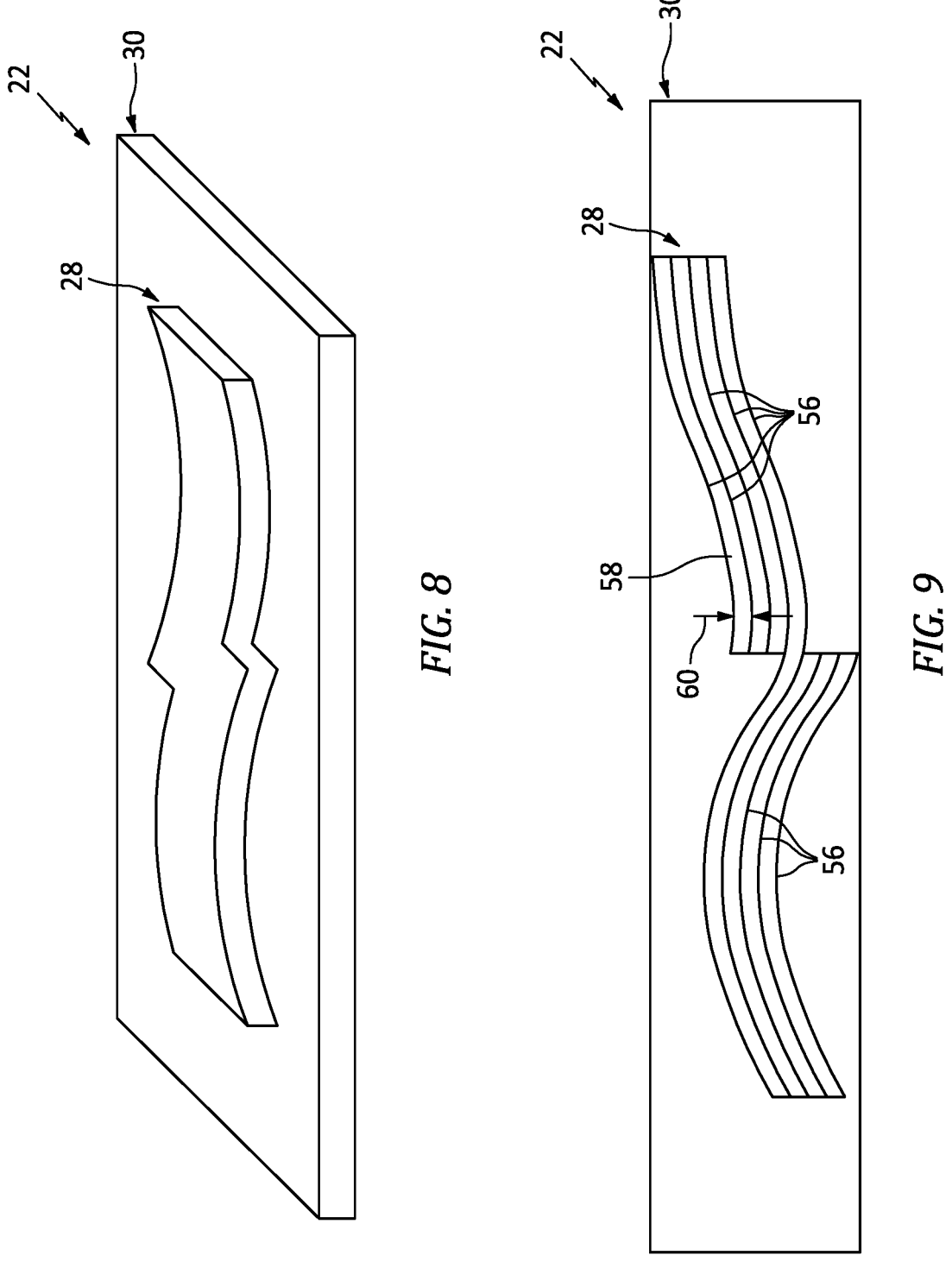
FIG. 8 is a perspective schematic illustration of one or more fiber-reinforced thermoplastic layers (collectively shown) on the thermoplastic substrate.
FIG. 9 is a schematic illustration of the thermoplastic layer(s) on the thermoplastic substrate.

In step 408, the deposition step 406 may be repeated one or more times (as needed) to form the stamping blank 22. Referring to FIG. 8, the stamping blank 22 may be a substantially two-dimensional (2D) blank. The stamping blank 22, for example, may be a substantially planar laminate of the thermoplastic substrate 30 with the one or more thermoplastic layers 28 (collectively shown in FIG. 8). Note, while the thermoplastic layer(s) 28 may provide the stamping blank 22 with contours, the thermoplastic layer(s) 28 may lay flat against the thermoplastic substrate 30 and the thermoplastic substrate 30 may be flat and planar; e.g., the stamping blank 22 may not include bends, creases, etc. The present disclosure, however, is not limited to such an exemplary planar configuration.

Referring still to FIG. 8, each of the thermoplastic layers 28 may have a common configuration. The thermoplastic layers 28, for example, may have common material make-ups, common geometries (e.g., dimensions, peripheral boundary shapes, etc.) and/or common patterns of fibers within their thermoplastic fiber reinforcements. For example, referring to FIG. 9, the layer reinforcement fibers 56 in each thermoplastic layer 28 may be arranged in a parallel pattern where (e.g., all of) the layer reinforcement fibers 56 are parallel with one another. Each of the layer reinforcement fibers 56, however, may also follow a non-straight line trajectory within the respective thermoplastic layer 28/through the layer thermoplastic 58. At least a portion or an entirety of each layer reinforcement fiber 56, for example, may follow a curved, splined, arcuate or otherwise non-straight line trajectory along its longitudinal length. The layer reinforcement fiber trajectories may be selected to provide certain fiber placements and/or orientations once the stamping blank 22 is stamped to provide the thermoplastic structure. The pattern of the layer reinforcement fibers 56 may thereby be different than the (e.g., standardized) substrate reinforcement fiber pattern of the thermoplastic substrate 30; e.g., see FIGS. 6 and 7. The tailored layer reinforcement fiber pattern for each thermoplastic layer 28 may be readily provided using the AFP device 24 as described above.

Figure 10B:
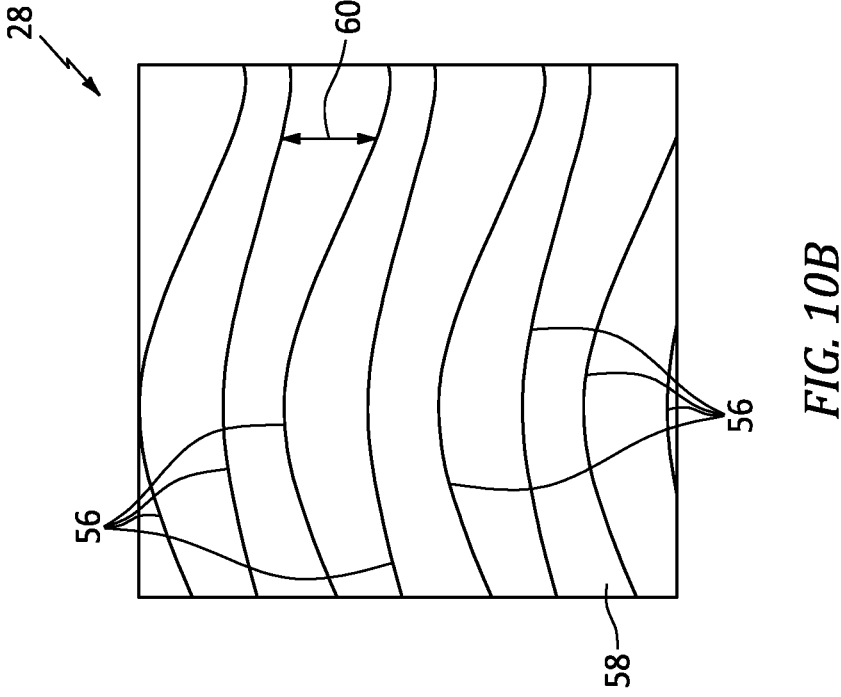
FIGS. 10A and 10B are schematic illustrations of portions of thermoplastic layers with various inter-fiber spacings and/or draping patterns.
Figure 10A:
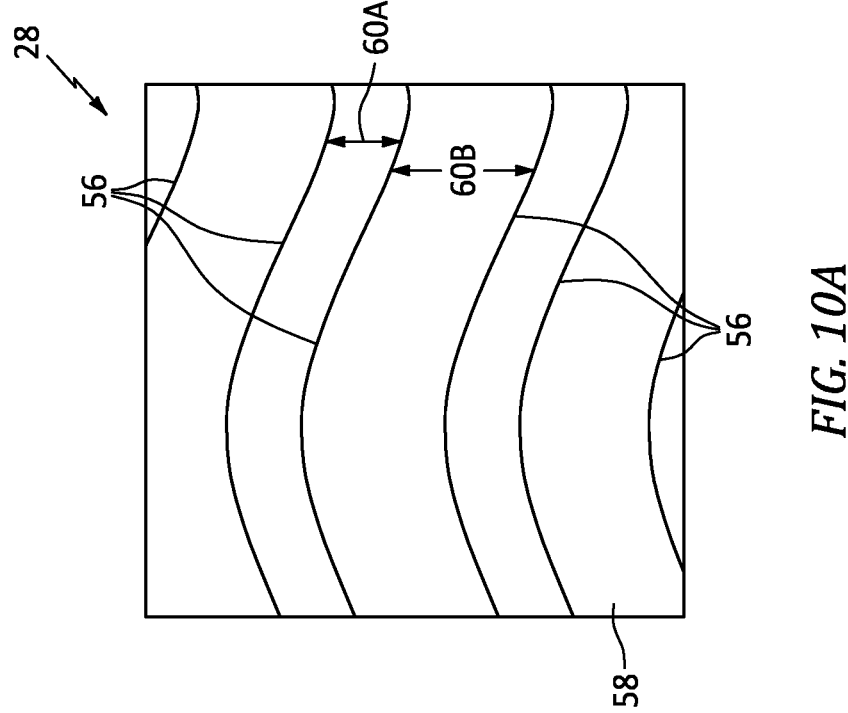

Within each thermoplastic layer 28, referring to FIG. 9, the layer reinforcement fibers 56 may be uniformly spaced from one another. Each layer reinforcement fiber 56, for example, may be laterally spaced from each similarly oriented neighboring (e.g., laterally adjacent) layer reinforcement fiber 56 by a common distance 60. This distance 60 may also stay constant along longitudinal lengths of the neighboring layer reinforcement fibers 56. However in other embodiments, referring to FIGS. 10A and 10B, the lateral spacing between at least some of the layer reinforcement fibers 56 may be non-uniform. At least one of the layer reinforcement fibers 56 of FIG. 10A, for example, may be laterally spaced from one neighboring layer reinforcement fiber 56 by a different lateral distance 60A, 60B than its other neighboring layer reinforcement fiber 56. However, the distances 60A, 60B may also stay constant along the longitudinal lengths of the neighboring layer reinforcement fibers 56. In another example, the lateral spacing distance 60 of FIG. 10B between neighboring layer reinforcement fibers 56 may change (e.g., increase and/or decrease) along the longitudinal lengths of the neighboring layer reinforcement fibers 56. Varying the inter-fiber spacings as shown, for example, in FIGS. 10A and 10B may further facilitate certain fiber placement as well as tailoring the stamping blank thickness.

Figures 11, 12:
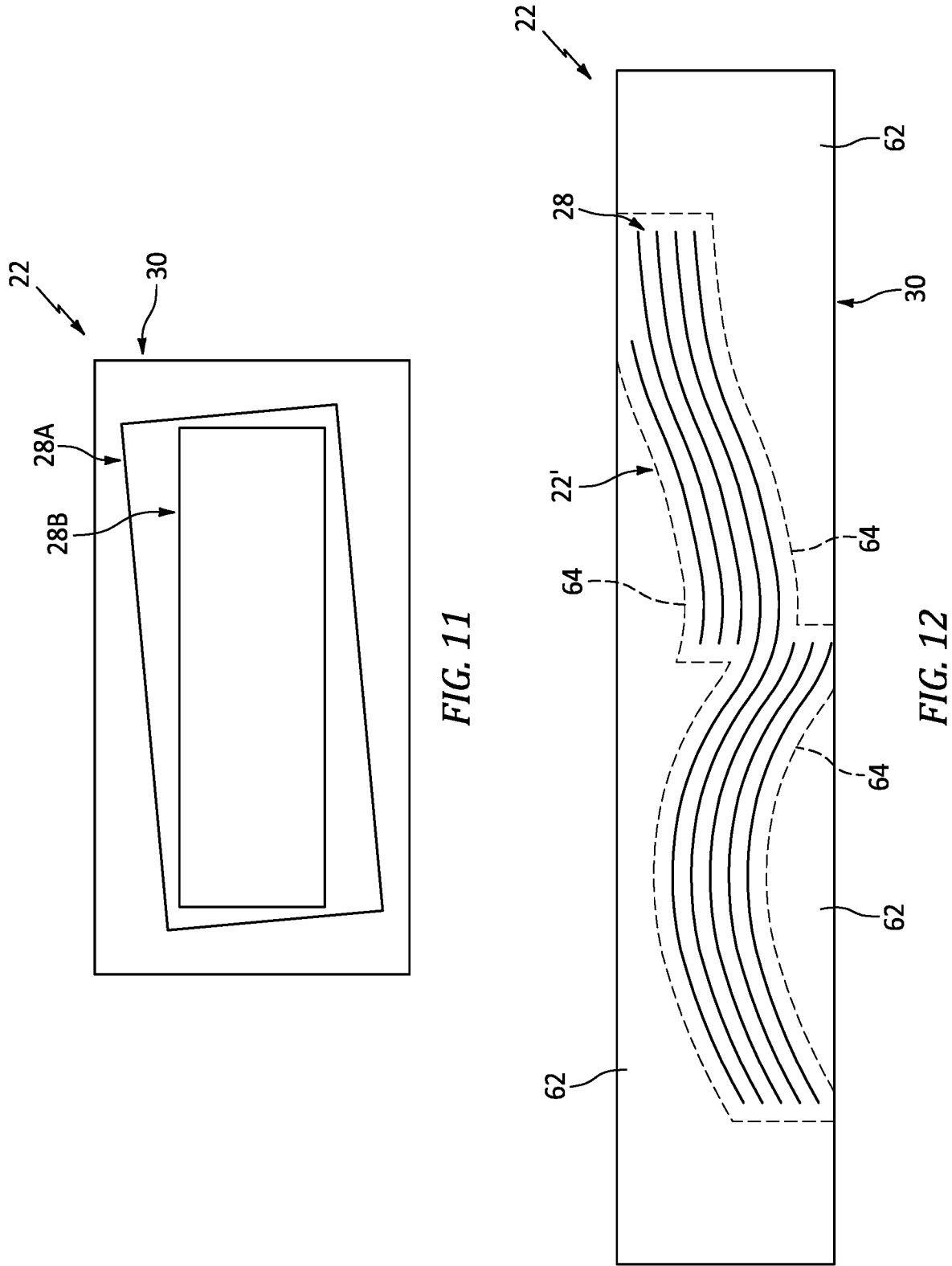
FIG. 11 is a schematic illustration of the stamping blank with multiple thermoplastic layers having different configurations.
FIG. 12 is a schematic illustration of the stamping blank with a trim line.

Each of the thermoplastic layers 28 may have a common configuration as described above. Alternatively, referring to FIG. 11, at least one of the thermoplastic layers (e.g., 28A) may have a different configuration than another one of the thermoplastic layers (e.g., 28B). The thermoplastic layer 28A, for example, may have a different geometry (e.g., dimensions, peripheral boundary shapes, etc.) than the thermoplastic layer 28B. The thermoplastic layers 28A and 28B may also or alternatively (or may not) have different layer reinforcement fiber patterns.

In step 410, the stamping blank 22 may be trimmed to provide a trimmed stamping blank 22'. For example, referring to FIG. 12, certain portions 62 of the stamping blank 22 may be removed; e.g., cut off. Since these portions 62 are to be removed, the thermoplastic layers 28 may be configured to reduce material waste. The thermoplastic layers 28, for example, may be selectively deposited on/cover portions of the thermoplastic substrate 30 that will be retained following the trimming. Of course, in other embodiments, the thermoplastic layer(s) 28 may slightly overlap the trimline 64.

Figure 13:
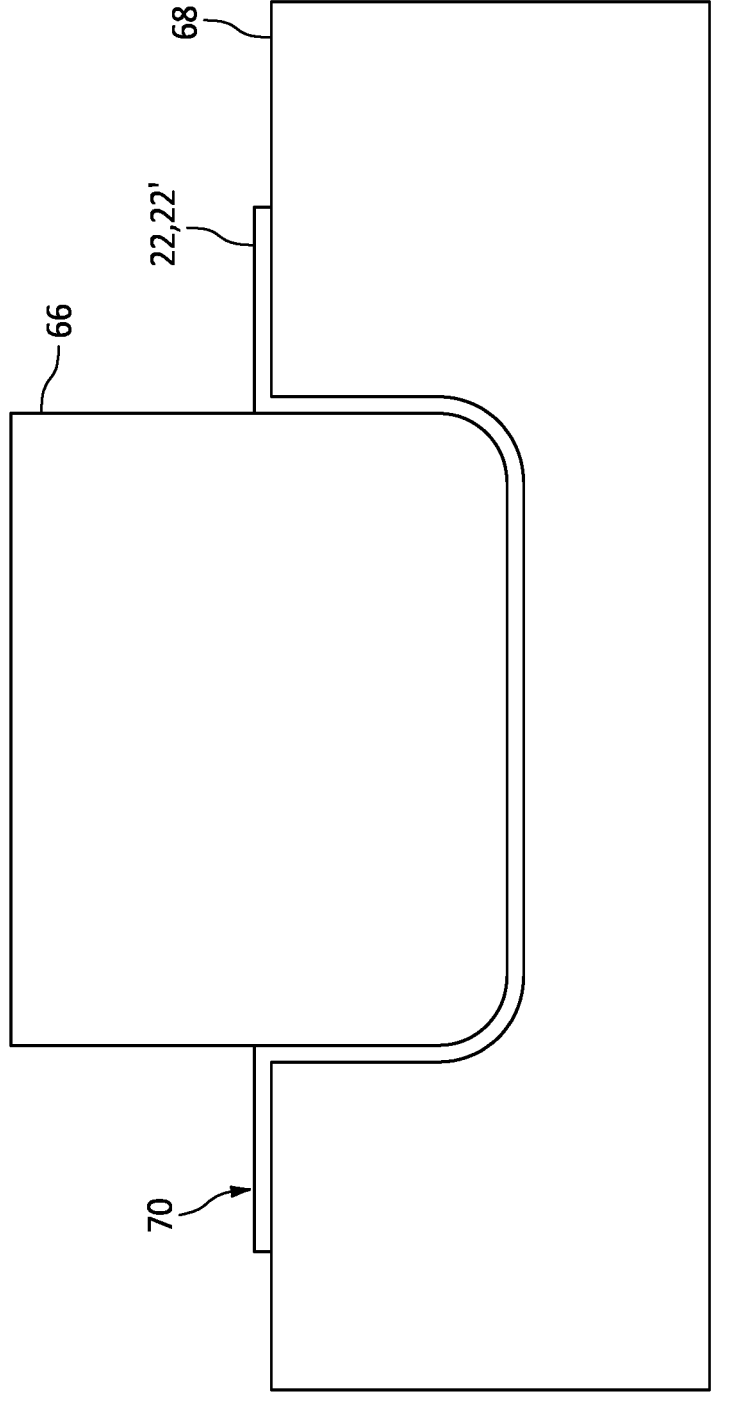
FIG. 13 is a schematic illustration of the stamping blank during a stamping process.

In step 412, the trimmed stamping blank 22' (or the stamping blank 22 if trimming is not needed) is stamped to form the thermoplastic structure. The stamping blank 22, 22' of FIG. 13, for example, may be stamped between a first (e.g., top and/or male) stamping die 66 and a second (e.g., bottom and/or female) stamping die 68. This stamping process may transform the substantially two-dimensional stamping blank 22, 22′ into the three-dimensional thermoplastic structure 70.

The formation method 400 is described above as performing the steps 402, 404, 406, 408 and 410 during the method. However, it is contemplated any one, some or all of these steps may be performed prior to implementing the formation method 400. For example, it is contemplated the formation method 400 may include the steps 410 and 412, or the step 412, and the prior steps may be performed during one or more other formation methods, by the same party (e.g., manufacturer) or another party.

Figure 14A:
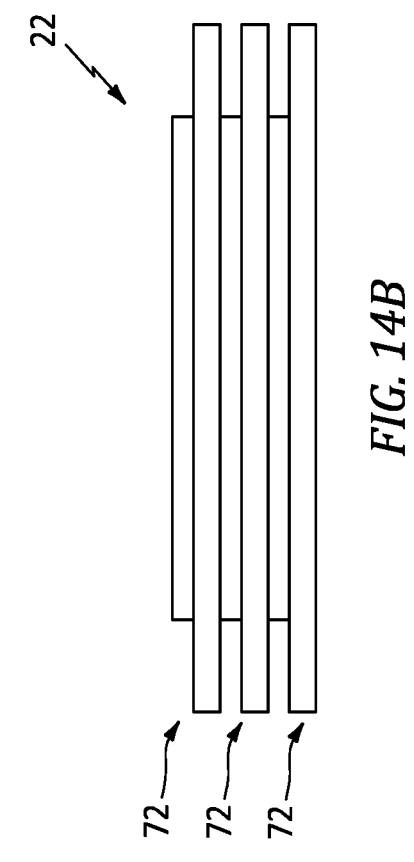
FIGS. 14A and 14B are schematic illustrations depicting alternative steps for forming the stamping blank.
Figure 14B:
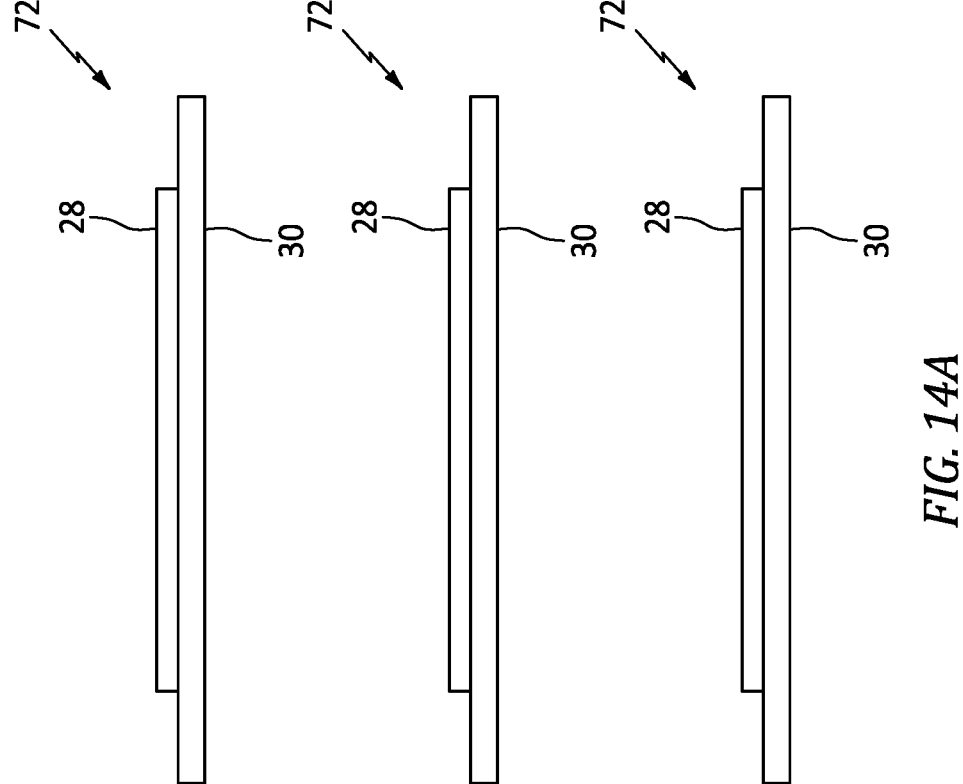

In some embodiments, the respective stamping blank members 28 and 30, 28 and 28 may be consolidated together during the depositing of the respective thermoplastic layer 28. In other embodiments, the respective thermoplastic layer 28 may be tacked to the underlying material. In such embodiments, a multi-layer stack of the stamping blank members 28 and 30 may be consolidated between, for example, the steps 408 and 410. This stack of the stamping blank members 28 and 30 may be consolidated, for example, in an autoclave or oven within a vacuum bag, and with or without additional external pressure. In still other embodiments, referring to FIGS. 14A and 14B, each thermoplastic layer 28 may be deposited onto a separate thermoplastic substrate 30 (e.g., a sheet of thermoplastic prepreg) to provide a respective laminate member 72. These partially consolidated (e.g., tacked) laminate members 72 may subsequently be stacked together to provide the stack, and the stack may be consolidated together to provide the stamping blank 22.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for forming a thermoplastic structure, comprising:

providing a substrate, the substrate including a substrate thermoplastic and a plurality of substrate fibers disposed within the substrate thermoplastic, the plurality of substrate fibers arranged in a substrate pattern, and a first of the plurality of substrate fibers following a straight trajectory within the substrate thermoplastic;

depositing a first layer on a surface of the substrate using an automated fiber placement device, the first layer including a first layer thermoplastic and a plurality of first layer fibers disposed within the first layer thermoplastic, the plurality of first layer fibers arranged in a first layer pattern that is different than the substrate pattern, and a first of the plurality of first layer fibers following a non-straight trajectory within the first layer thermoplastic when viewed in a reference plane parallel to the surface of the substrate;

providing a second substrate, the second substrate including a second substrate thermoplastic and a plurality of second substrate fibers disposed within the second substrate thermoplastic, and the plurality of second substrate fibers arranged in a second substrate pattern;

depositing a second layer on the second substrate using the automated fiber placement device, the second layer including a second layer thermoplastic and a plurality of second layer fibers disposed within the second layer thermoplastic, and the plurality of second layer fibers arranged in a second layer pattern that is different than the second substrate pattern;

stacking the second substrate with the second layer onto the substrate with the first layer to provide a multi-layer stack;

consolidating the multi-layer stack together to provide a blank; and stamping the blank to provide the thermoplastic structure.

2. The method of claim 1, wherein the substrate comprises a two-dimensional laminate.

3. The method of claim 1, wherein the substrate pattern is a unidirectional pattern of the plurality of substrate fibers.

4. The method of claim 1, wherein the substrate pattern comprises a weave of the plurality of substrate fibers.

5. The method of claim 1, wherein the substrate is configured as a pre-consolidated laminate.

6. The method of claim 1, wherein the substrate comprises a sheet of prepreg material; and the first layer is deposited on the sheet of prepreg material.

7. The method of claim 1, wherein the first layer thermoplastic is consolidated with the substrate thermoplastic during the depositing of the first layer using the automated fiber placement device.

8. The method of claim 1, further comprising consolidating the first layer thermoplastic with the substrate thermoplastic following the depositing of the first layer.

9. The method of claim 1, wherein the first layer is deposited on a select portion of the substrate.

10. The method of claim 1, wherein the substrate has an outer peripheral substrate geometry; and the first layer has an outer peripheral first layer geometry that is different than the outer peripheral substrate geometry.

11. The method of claim 1, further comprising removing at least a portion of the substrate not covered by the first layer.

12. A method for forming a thermoplastic structure, comprising:

providing a first substrate, the first substrate including a first substrate thermoplastic and a plurality of first substrate fibers disposed within the first substrate thermoplastic;

depositing a first layer on the first substrate using an automated fiber placement device to provide a first laminate member, the first layer including a first layer thermoplastic and a plurality of first layer fibers disposed within the first layer thermoplastic;

providing a second substrate, the second substrate including a second substrate thermoplastic and a plurality of second substrate fibers disposed within the second substrate thermoplastic;

depositing a second layer on the second substrate using the automated fiber placement device to provide a second laminate member, the second layer including a second layer thermoplastic and a plurality of second layer fibers disposed within the second layer thermoplastic;

subsequently stacking the first laminate member and the second laminate member to provide a multi-layer stack;

consolidating the multi-layer stack together to provide a blank; and stamping the blank to provide the thermoplastic structure.

13. The method of claim 12, wherein the first substrate comprises a two-dimensional laminate.

14. The method of claim 12, wherein the plurality of first substrate fibers are arranged in a first substrate pattern, and the plurality of first layer fibers are arranged in a first layer pattern that is different than the first substrate pattern.

15. The method of claim 12, wherein the first substrate is configured as a pre-consolidated laminate.

* * * * *